METHOD AND APPARATUS FOR RECORDING AND REPRODUCING VIDEO AND AUDIO SIGNAL SIMULTANEOUSLY ON MAGNETIC TAPE

Filed Oct. 22, 1962

INVENTOR.
JAMES U. LEMKE
BY
Christie, Parker & Hale
ATTORNEYS.

United States Patent Office 3,283,085
Patented Nov. 1, 1966

3,283,085

METHOD AND APPARATUS FOR RECORDING AND REPRODUCING VIDEO AND AUDIO SIGNAL SIMULTANEOUSLY ON MAGNETIC TAPE

James U. Lemke, Los Angeles, Calif., assignor, by mesne assignments, to Bell & Howell Company, Chicago, Ill., a corporation of Illinois Filed Oct. 22, 1962, Ser. No. 231,935
5 Claims. (Cl. 179—100.2)

This invention relates to magnetic tape recorders and, more particularly, is concerned with a method and apparatus for simultaneously recording video and audio frequency signals on magnetic tape.

The recording on magnetic tape of the broad frequency spectrum of television or video signals has been accomplished by special tape transport mechanisms in which the magnetic tape is caused to move at high speed relative to the magnetic recording head. To conserve tape and to limit the speed at which the tape must be driven, various arrangements have been proposed in which the magnetic head is caused to scan across the magnetic tape, laying down a signal along a series of narrow tracks, each track extending from one margin to the other margin of the tape. By scanning the magnetic head at high speed across the tape, a high relative speed between the tape and the head is accomplished, while at the same time the forward drive speed of the tape is kept at a relatively slow level. Video recorders of this type require accurate speed control of the scanning head during recording and playback to obtain proper tracking of the playback head in relation to the signals laid down on the magnetic tape and to obtain faithful reproduction of the recorded frequencies. This necessitates a control or reference signal on the magnetic tape. In addition, some provision must be made for recording the audio signal where the recorder is being used for reproducing standard television type broadcasts.

It has been the practice heretofore to provide separate tracks along the margins of the tape for recording a control signal and an audio signal. Such an arrangement results in a rather wide tape, which in turn complicates the tape drive and tape guidance arrangement of the tape transport. Furthermore, means must be provided for effecting isolation between the video tracks in the center of the tape and the control and audio tracks along the margin of the tape.

According to the present invention, it has been found that the audio and/or control signals can be effectively recorded in the same area as the video tracks. The video tracks are normally separated by guard bands where no information is recorded. According to the present invention, these guard bands can be used for the recording of the audio and control signals without any interference or deterioration of the video signals. Thus the usual tracks along the margins of the tape can be eliminated and the problem of isolation between the video tracks and the auxiliary tracks along the margins of the tape is thereby avoided.

This is accomplished, in brief, by a unique method of recording in which the audio and/or control signals are first recorded on the tape in a track extending lengthwise of the tape and subsequently recording the video signal in a plurality of tracks extending in spaced apart parallel relationship at an oblique angle to the margins of the tape and overlying the audio track. The video tracks are each made substantially narrower in width than the audio track. By this method a portion of the audio signal is preserved in the guard bands between adjacent video tracks. By using an audio playback head in which the gap extends transversely across the width of the tape, the audio signals remaining in the guard bands between the video tracks add in phase across the transverse gap of the audio playback head. However, the video tracks across the audio playback head produce signals in the playback head which are not coherent and add only as noise.

For a more complete understanding of the invention, reference should be made to the accompanying drawings, wherein.

Figure 1:
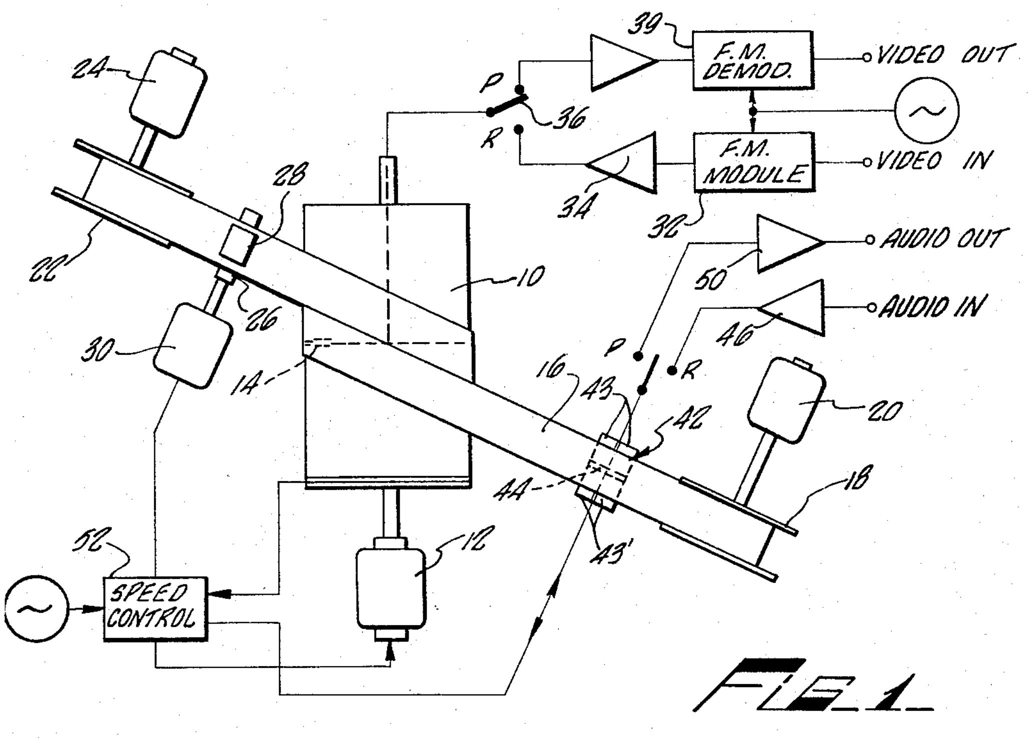
FIGURE 1 is a top view of the tape transport diagrammatically showing the relationship of the tape, the transducers, and the drive mechanism.
Figure 2:
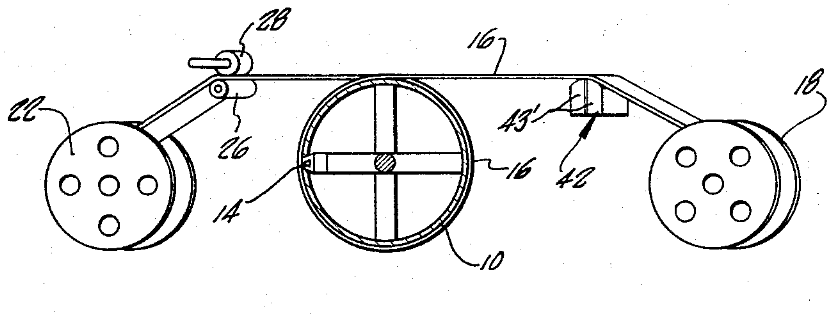
FIGURE 2 is a side view of the tape transport shown in FIGURE 1.

The tape transport may take a variety of forms which are well known in the art and which are arranged to lay down a video signal in a series of tracks which extend slantwise between the margins of the tape. An example of a suitable transport is shown in FIGURE 1 but may be of a type such as described in more detail in U.S. Patents 2,773,120 and 2,919,314 for example. In this type of transport, the slantwise tracks are achieved by passing the tape in a spiral wrap around a rotating cylinder having one or more heads arranged in a plane around the periphery of the cylinder. As shown in FIGURE 1, the numeral 10 indicates such a cylinder or drum which is rotated by a synchronous motor 12. A transducer head 14 arranged to record and reproduce high frequency signals is mounted in the head in any suitable manner so as to rotate with the cylinder 10. The transducer head 14 has a magnetic gap lying flush with the surface of the cylinder so as to be in contact with the magnetic tape, indicated at 16, which is wrapped around the periphery of the cylinder 10.

The magnetic tape 16 is stored on a supply reel 18 driven by a reel motor 20. The reel 18 is arranged at an angle to the axis of the cylinder 10 so that the tape is directed onto the cylinder 10 from the reel 18 at an angle. The tape makes a complete helical turn around the cylinder 10 and passes from the cylinder 10 to a take-up reel 22 driven by a reel motor 24. The linear speed of the tape is controlled by a capstan drive including a capstan 26 held in engagement with the tape by a pinch roller 28. The capstan 26 is driven at a controlled speed by a synchronous motor 30.

A video signal is recorded on the tape in conventional fashion as described, for example, in U.S. Patent 2,956,-114. The broad band video signal is first frequency modulated by a suitable FM modulator 32, amplified by an amplifier 34, and coupled through a switch 36, set to the record position R, to the transducer head 14. On playback the switch 36, set to the playback position P, connects the head to the playback amplifier 37. The signal is then demodulated by a discriminator or other suitable circuit, indicated at 39.

Figure 3:
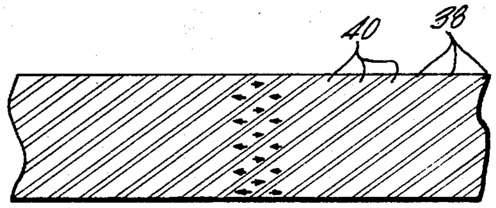
FIGURE 3 illustrates a portion of a recorder tape showing the paths of the video recording tracks.

Among other advantages of FM modulation recording of the video signal, it permits saturation recording on the magnetic tape. The resulting recording pattern of the video signal on tape is shown in FIGURE 3. Each revolution of the cylinder 10 produces a single diagonal recording track on the tape. Because of the linear motion of the tape itself, successive revolutions of the cylinder produce parallel tracks which are spaced at a pitch distance determined by the relative speed of the tape and the rotating cylinder. In FIGURE 3, the numeral 38 indicates the video tracks and the numeral 40 indicates the guard bands existing between the video tracks.

According to the present invention, an audio signal as well as a control signal may be recorded on the magnetic tape 16 in the same area of magnetic tape which contains the video information. This is accomplished in the arrangement shown in FIGURE 1 by providing a magnetic head 42 extending across the full width of the tape at a point between the supply reel 18 and the video recording cylinder 10. If only the audio signal is to be recorded, the magnetic head 42 is arranged with the poles extending the full width of the tape, thus providing a magnetic recording gap extending transversely of the tape from one margin to the other. If both an audio and a control signal are to be recorded, as specifically shown in FIGURE 1, the head 42 may be provided with two sets of poles 43 and 43' with shielding 44 between so that in effect two channels are provided in which the magnetic gap for each channel extends across half the width of the tape.

The audio signal is coupled to one half of the head 42 through a suitable amplifier 46 and switch 48 set in its record position R. Conventional amplitude modulation of a bias signal for recording the audio information may be used in a conventional fashion. Playback of the audio signal is derived from the same head 42 through the switch 48 in the playback position P and suitable playback amplifier 50.

A control signal also may be recorded on the tape by means of the other half of the recording head 42, the control signal being developed by a speed control circuit 52. During playback the control signal is reproduced from the magnetic tape and applied to the speed control circuit 52. An example of a suitable speed control circuit is described in detail in U.S. Patent 2,956,114.

The method of operation of the invention is as follows. Magnetic tape first passes over the recording head 42 for recording of the audio and/or of the control signal on the tape. Because the recording gap of the magnetic head 42 extends transversely across the full width of the tape, the full width of the tape is magnetized by the audio and control signals. The tape then passes over the cylinder 10 where the slantwise video tracks are laid down on the tape. The video tracks are recorded right over the existing video and control information. Because the video recording involves a saturation recording technique, namely, FM modulation, the video recording is unaffected by the previous signals laid down on the tape.

FIGURE 3 illustrates in exaggerated form the resulting pattern on the magnetic tape. The flux domains produced by the audio and/or control signals are indicated by the arrows. The slant lines indicate the overlying video tracks. It will be seen that a portion of the audio signal remains in the guard spaces between the video tracks. On playback, the tape again passes first over the head 42 and then around the cylinder 10. During playback, the audio and control signals which are in the guard bands add in phase at the transverse gap of the playback head 42. However, the magnetic flux in the video tracks are not in phase and add in a random fashion, resulting only in an increase to the noise level at the output of the playback head 42. Because there are a number of guard bands across any transverse section of the tape, the signal-to-noise ratio between the desired audio and control signals and the noise produced by the overlying video tracks is sufficiently high to adequately reproduce the audio and control signals.

Thus it will be seen that a unique method of recording both video and audio signals on tape has been provided. This has been accomplished by utilizing the space between the video tracks, thus making more efficient use of the full tape recording area. As a result, a narrower tape can be used without any loss in the total recorded information. By using narrower tape, a considerable cost saving is realized not only in the tape itself but in the overall design and construction of the associated transport system.

What is claimed is:

1. A method of recording two separate signals on one side of a single magnetic tape comprising the steps of recording one signal in a first track extending lengthwise of the tape and subsequently recording the second signal at a saturation level in a plurality of tracks extending in spaced apart parallel relationship at a small oblique angle to the margin of the tape and overlying the first track, each of said plurality of tracks being substantially narrower in width than the first track, the width of the first track being sufficiently large to span several of the overlying narrow tracks in a direction perpendicular to the edges of the tape.

2. A method of recording two signals on magnetic tape comprising the steps of recording the first signal in a first track extending lengthwise of the tape, and subsequently recording the second signal in a plurality of tracks extending in spaced apart parallel relationship at a small oblique angle to the margins of the tape and overlying the first track, the second signal being recorded at a level to magnetically saturate the tape and thereby erase the first signal in the area of said plurality of tracks, the said plurality of tracks each being much narrower in width than said first track, the width of the first track being sufficiently large to span several of the overlying narrow tracks in a direction perpendicular to the edge of the tape.

3. The method of magnetically recording and reproducing more than one signal simultaneously on magnetic tape comprising the steps of first recording a first signal on the tape in a wide track extending lengthwise of the tape, subsequently recording a second signal at a saturation level in a plurality of narrow tracks overlying and extending at a small oblique angle to the path of the first track, the narrow tracks being spaced apart to provide intermediate bands in which portions of the first recorded signal remain unaffected by the second saturation recorded signal, and generating a playback signal corresponding to the first signal in response to the changes in the average flux level on the tape as measured across the full width of the wide track.

4. A magnetic recording device for recording two separate signals on magnetic tape comprising a first transducer having an elongated gap extending substantially transverse to the path of the tape, means for generating a varying field across the gap in response to one of said signals, a second transducer having a gap that is substantially shorter in length than the gap of the first transducer, means for moving the tape successively past the first transducer and then past the second transducer, means for repeatedly scanning the second transducer across the surface of the moving tape along a path extending from one margin to the other at an angle to the direction of movement of the tape, and means for generating an oscillating field across the gap of the second transducer in response to the other of said signals, said means generating a field having a peak amplitude sufficient to magnetically saturate the tape at the area of contact with the second transducer.

5. Apparatus for recording two signals simultaneously on magnetic tape and reproducing the two signals separately, comprising means for moving the tape in one direction at constant speed, means responsive to a first input signal for generating a varying field, the tape moving through the field to magnetize the tape in response thereto, means responsive to the second input signal for generating an oscillating field with a peak amplitude sufficient to saturate the surface of the tape, means for moving said last-named generating means repeatedly across the tape at a small acute angle to the path of movement of the tape as the tape is moved to produced a plurality of spaced-apart parallel tracks at an angle to the path of the tape, the generating means responsive to the second signal being in position relative to the path of the tape to record over the recording of the first signal, and transducer means responsive to the changes in flux on the tape over a substantial portion of the width of the tape for generating an electrical signal in response to the changes in the average flux across the width of the tape.

References Cited by the Examiner

UNITED STATES PATENTS

| | | | |
|---|---|---|---|
| 2,712,572 | 7/1955 | Roberts | 179—100.2 |
| 2,929,670 | 3/1960 | Garrity | 179—100.2 |
| 3,020,356 | 2/1962 | Barry | 179—100.2 |

BERNARD KONICK, *Primary Examiner.*

J. R. GOUDEAU, P. ROTH, *Assistant Examiners.*